Oct. 17, 1939.  B. J. GOLDSMITH  2,176,710
APPARATUS AND METHOD OF FORMING CROSSES IN WARP
BEAMS AND THREAD WINDINGS THEREFOR
Filed Oct. 21, 1938   7 Sheets-Sheet 2

Inventor
BERTRAM J. GOLDSMITH.
By
Attorney

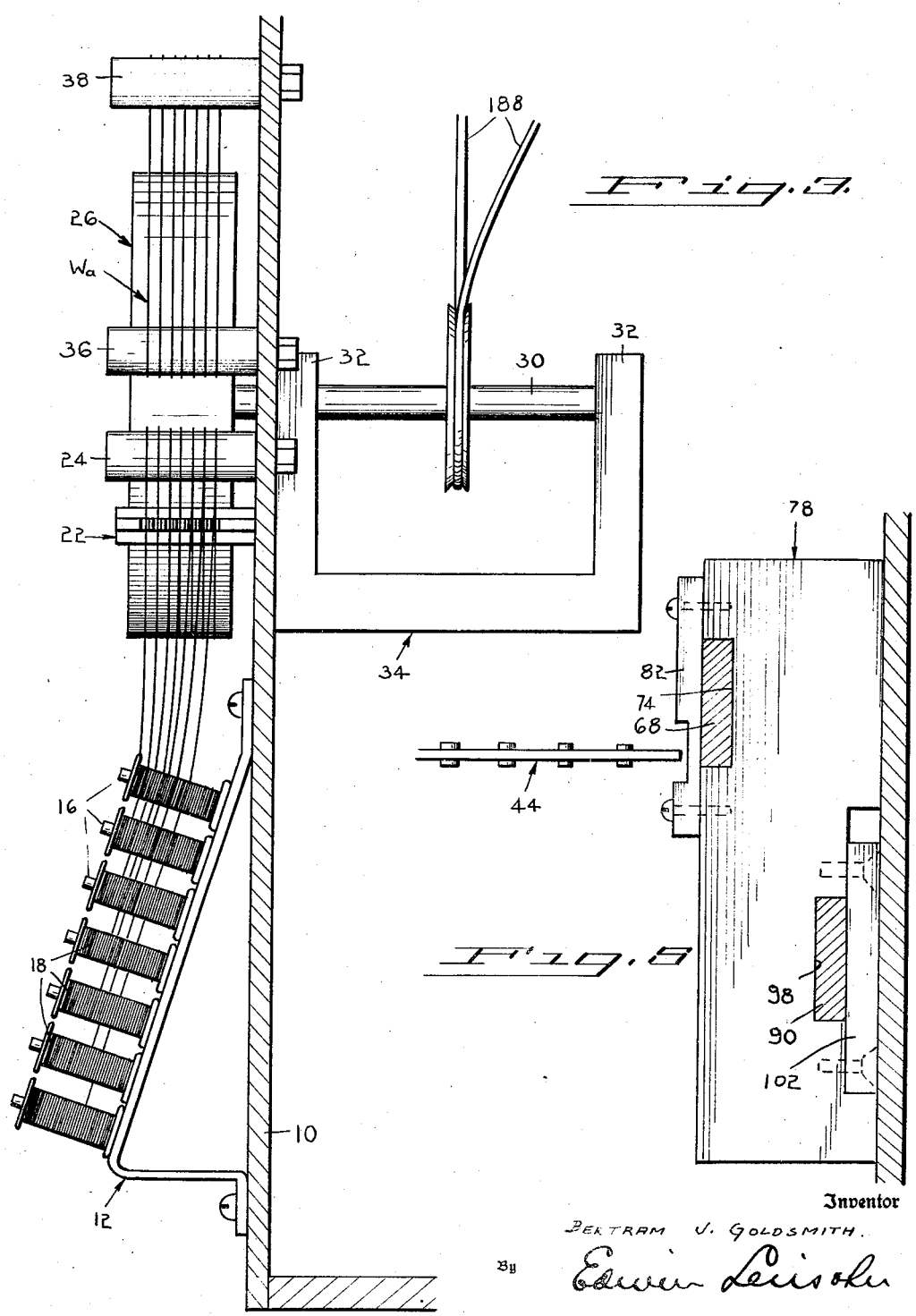

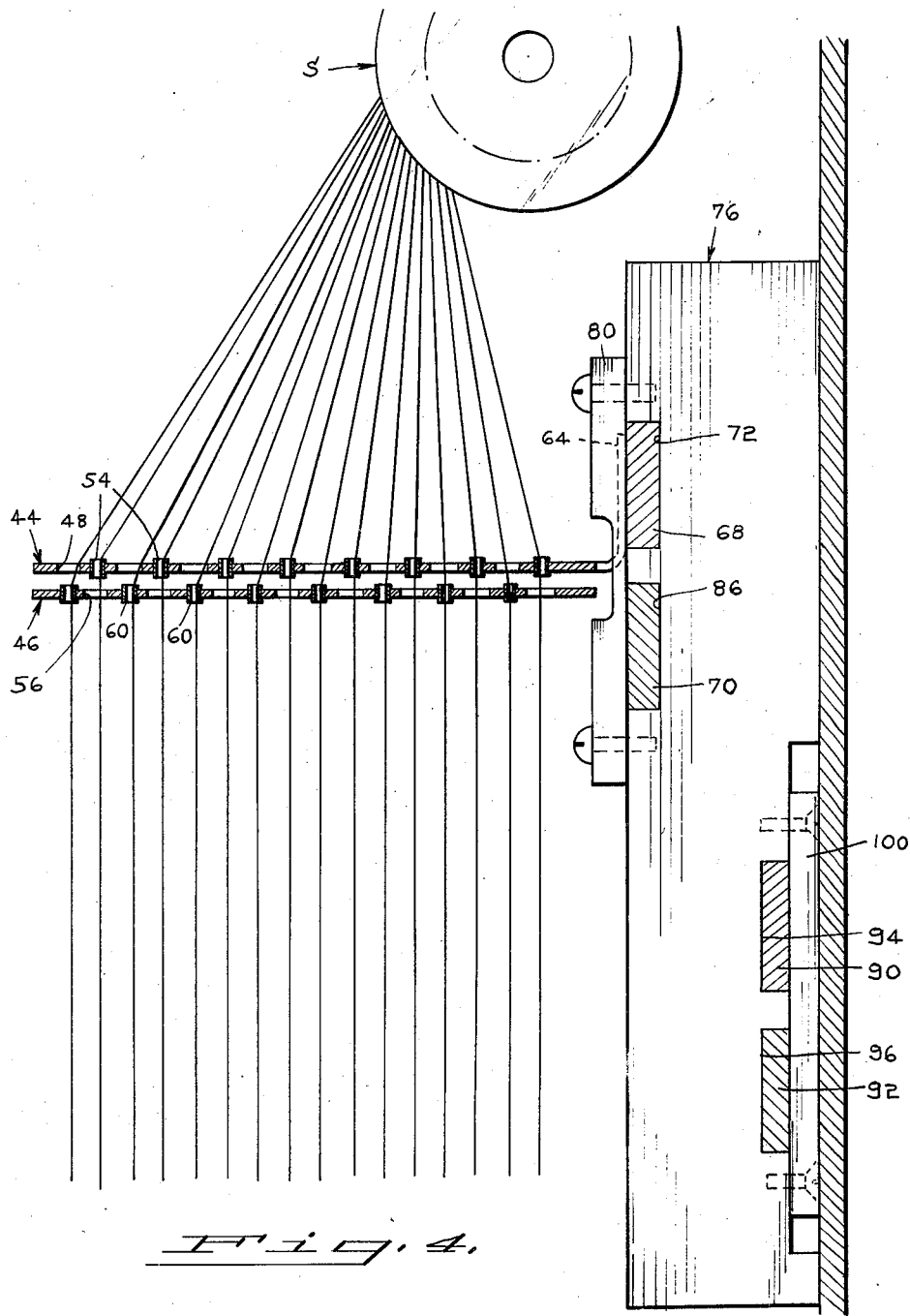

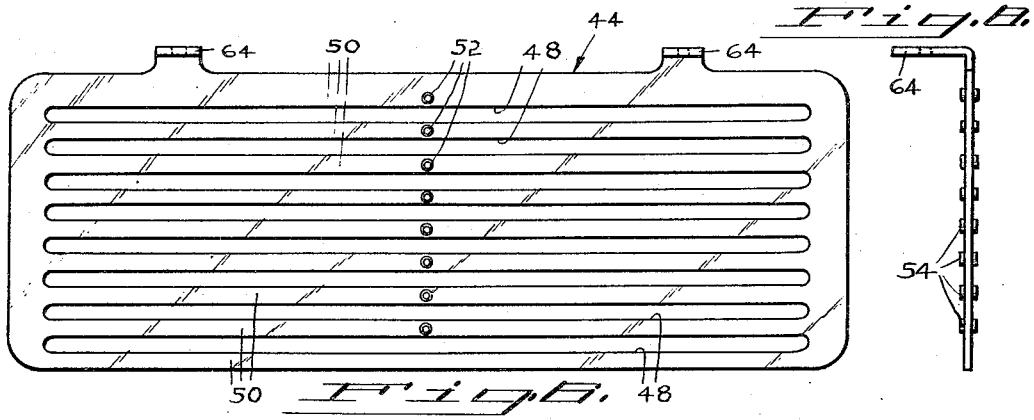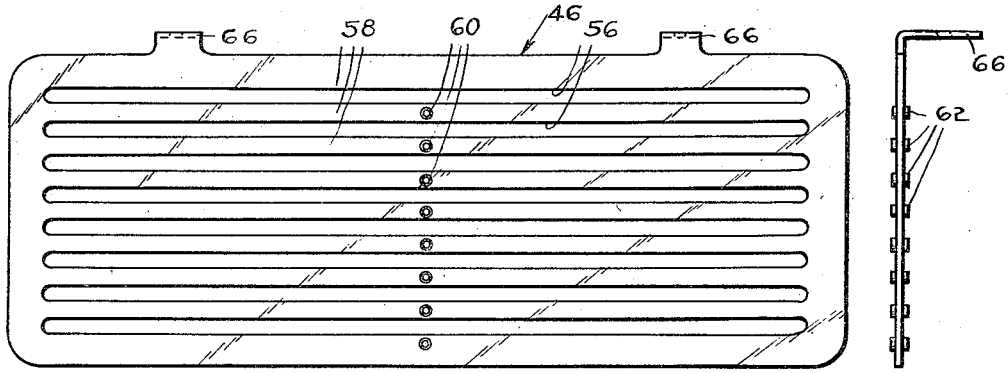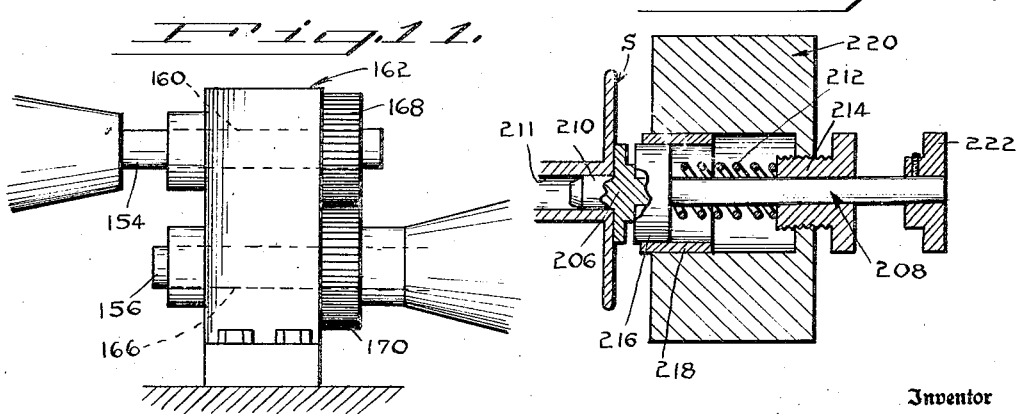

Oct. 17, 1939.                B. J. GOLDSMITH                2,176,710
        APPARATUS AND METHOD OF FORMING CROSSES IN WARP
                 BEAMS AND THREAD WINDINGS THEREFOR
                  Filed Oct. 21, 1938            7 Sheets-Sheet 6

Inventor
BERTRAM J. GOLDSMITH
By Edwin Levisohn
            Attorney

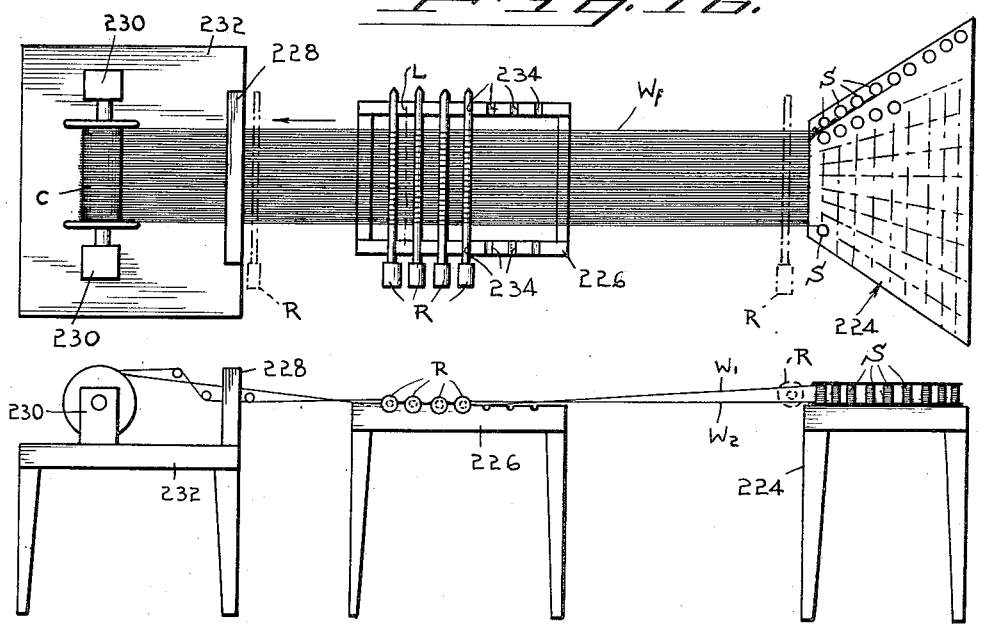
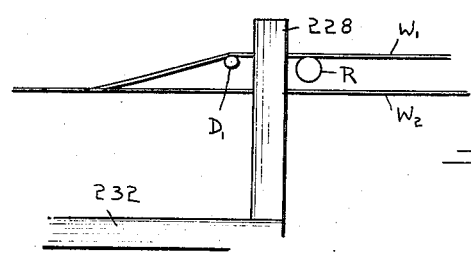
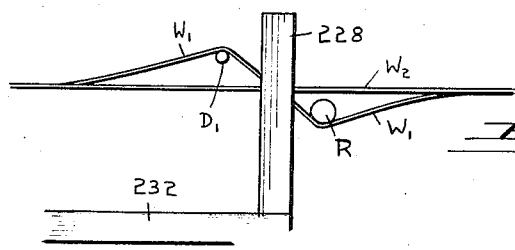
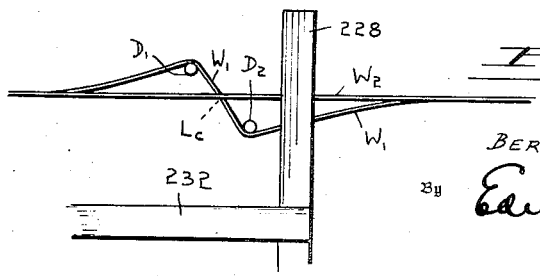

Patented Oct. 17, 1939

2,176,710

UNITED STATES PATENT OFFICE 2,176,710

APPARATUS AND METHOD OF FORMING CROSSES IN WARP BEAMS AND THREAD WINDINGS THEREFOR

Bertram J. Goldsmith, Neshanic, N. J.

Application October 21, 1938, Serial No. 236,207

20 Claims. (Cl. 28—40)

This invention relates to the art of forming crosses in warp beams, that is beams of warp threads utilized in a loom for weaving fabrics.

Heretofore, warp beams have been provided with crosses for the purpose of ascertaining the position of each thread in the beam, as for example, when a thread breaks in the course of weaving in the loom or for attaching the ends of the threads of a depleted beam to the proper ends of the threads of a replenishing beam. In accordance with one well known method of forming the crosses in the warp beam, there is utilized a device known as a cross-reed. The use of a cross-reed for forming the crosses is objectionable and highly disadvantageous because, among other things, it is necessary to pass the individual threads of the web of threads which go to make up the beam separately through the individual slots of the cross-reed. This is an extremely tedious and time-consuming operation even for narrow fabrics, such as ribbons or tapes, since the warp beam for such fabrics comprises a large number of individual threads. Obviously, the operation is even more onerous in the case of wider fabrics. It is, therefore, one object of the present invention to obviate the necessity for the use of a cross-reed or the like in the formation of crosses in a warp beam.

Another object of the invention is to provide a winding on a spool or the like in the form of webs of threads, with the threads in each web so arranged in relation to the threads of the other web, that upon withdrawing the webs from the winding, crosses are automatically formed in the withdrawn webs at spaced points longitudinally of the latter, so that when a plurality of such windings are arranged with respect to each other, a complete beam-forming web provided with crosses is produced.

A further object of the invention is the provision of a method for producing special windings on the individual spools to be subsequently utilized for forming the complete warp-beam forming web with crosses provided therein.

Another object of the invention is to provide a machine for facilitating the formation of the individual spool windings in accordance with the method of the present invention.

It is also an object of the invention to provide apparatus for making up the warp beam provided with crosses therein from a multiplicity of special windings provided as indicated above for that purpose.

The above objects of the invention and other objects which hereinafter appear will best be understood from the following description considered with reference to the accompanying drawings.

In the drawings:

Fig. 1a is a fragmentary end view of a part of the apparatus;

Fig. 3 is a vertical sectional view on the line 3—3 of Fig. 1;

Fig. 4 is a sectional view on the line 4—4 of Fig. 1;

Fig. 5 is a sectional view on the line 5—5 of Fig. 1;

Figs. 6 and 7 are plan views of the thread traversing and crossing members;

Figs. 8 and 9 are end views of the end crossing members shown in Figs. 6 and 7, respectively;

Fig. 11 is a detail view in elevation on the line 11—11 of Fig. 2;

Fig. 12 is a detail sectional view of part of the spool mounting;

Fig. 16 is a top plan view illustrating, more or less diagrammatically, the apparatus for forming the crosses in the warp beam from a plurality of windings produced in accordance with the present invention;

Fig. 17 is a side view of the apparatus illustrated in Fig. 16;

Figs. 18 to 20 are views illustrating, more or less diagrammatically, the steps in the method of securing the crosses in the full beam forming web;

In accordance with the present invention for forming the crosses in the warp beam, there is first produced a plurality of special windings on individual spools. Each of said windings comprises two non-woven and separable webs of non-woven and separable threads, with the individual threads of one web intersecting or crossing between the individual threads of the other web at a multiplicity of points in the winding on the spool in such manner that said threads are disposed in interleaving relation, so that when the spool is subsequently unwound, the crossed portions of the two webs are disposed at spaced points longitudinally of the thread webs. The winding of the webs of threads on the individual spools in this manner and the wind produced thereby constitute, respectively, a distinct step in the method and a distinct step product of the present invention. Having thus formed the windings on the individual spools as just referred to, the crosses are formed in the complete beam-forming web by unwinding the pairs of webs of threads from a multiplicity of individual spools thereby to produce a web of full width having crossed portions therein. Then the crosses thus automatically formed in the full beam-forming web of threads are secured, preferably as heretofore, by tying cords. Finally, the web provided with the crosses formed and secured therein is wound on the warp beam core, as heretofore, for use as the warp beam in the loop.

Figure 1:
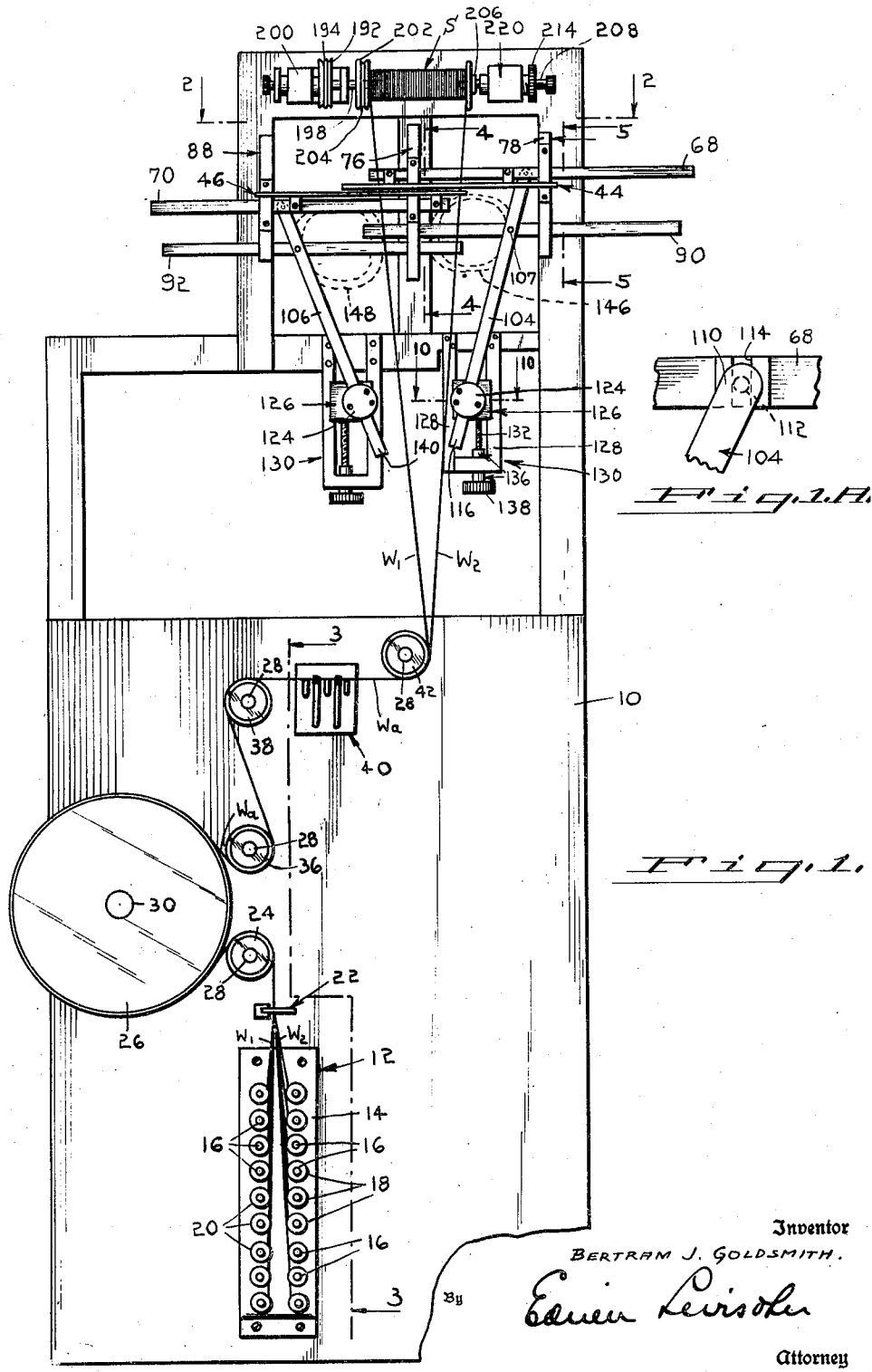
Fig. 1 is a front view of the thread winding apparatus.
Figure 2:
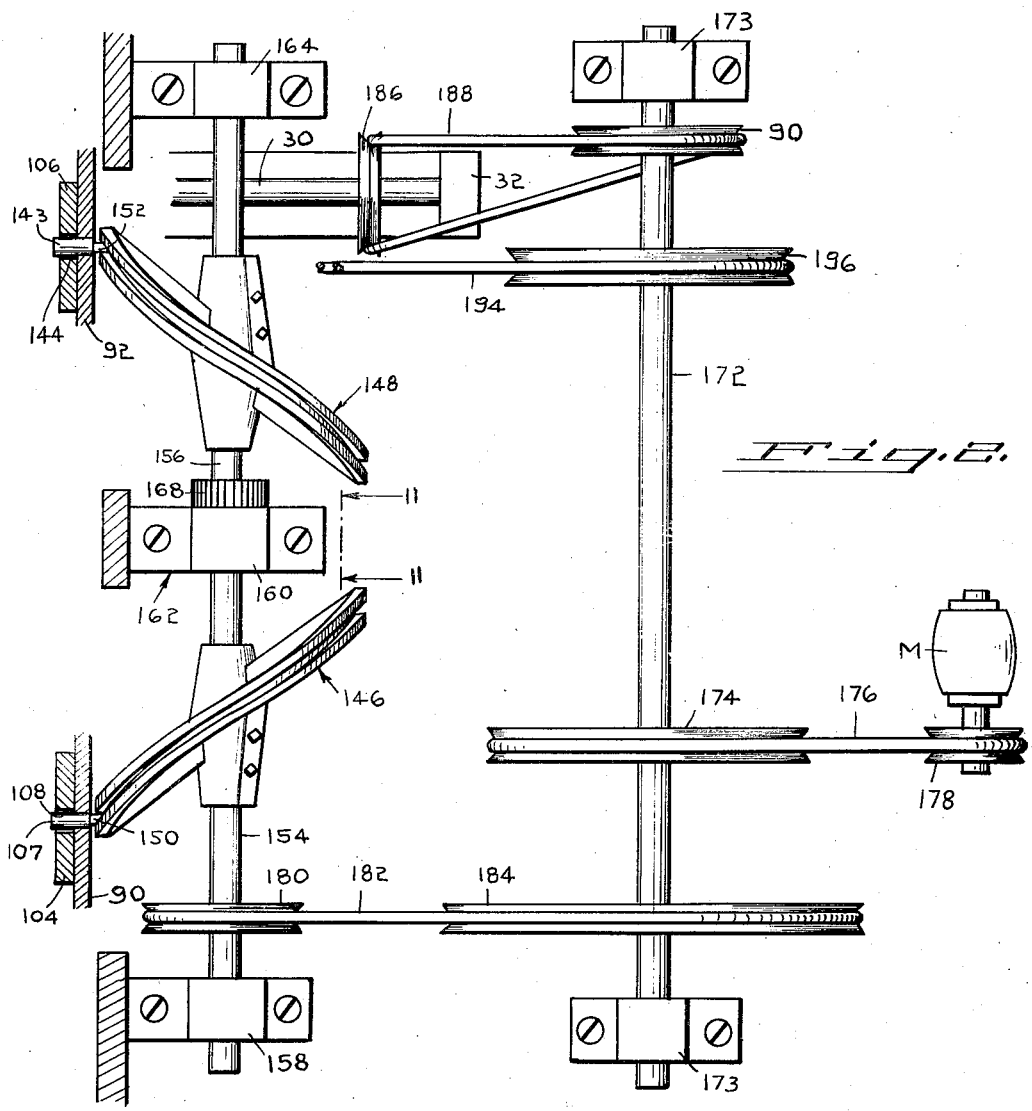
Fig. 2 is a sectional view on the line 2—2 of Fig. 1.
Figure 10:
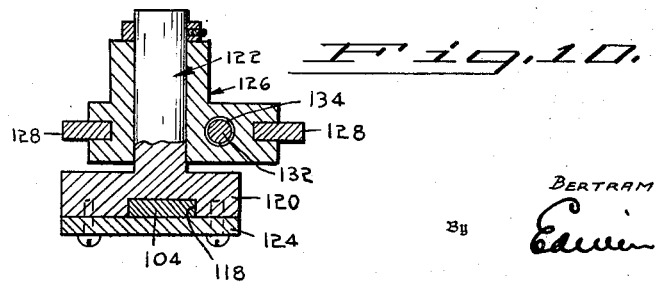
Fig. 10 is a detail sectional view on the line 10—10 of Fig. 1.

The method of producing the windings of webs of threads in which the threads of different webs are arranged in intersecting and interleaved relation on the spool and the machine for producing said windings will now be described. Referring now to the drawings in detail, the machine comprises a suitable frame having a front vertical panel 10 at the lower part of which there is mounted a spool creel 12. Said creel comprises an inclined plate 14 carrying spools of thread mounted for rotation about pins 16 which are secured to said plate in upstanding relation. As clearly shown in Fig. 1, there are two sets of spools 18 and 20 respectively, the spools of the same set being in aligned and vertically spaced relation and the spools of the different sets being spaced from each other laterally of plate 14. Each of the spools 18 and 20 has a winding of a single thread. The individual threads from said spools, as the latter are unwound, are directed upwardly from the spools in the space between the sets of spools to a reed 22 secured to and projecting forwardly of panel 10 above creel 12. It will be understood that the threads from the spools 18 and 20 are thus formed into webs W1 and W2 of threads disposed laterally of each other or in side by side relation, there being two of such webs, one derived from the spools 18 and the other derived from the spools 20. Said webs of threads are directed over a guide roller 24 to and over a rotary drum 26. On the drum the webs may be close to each other and appear as a single web Wa. Guide roller 24 is mounted for rotation on a pin 28 which is secured to and projects forwardly from panel 10 above reed 22. Drum 26 is driven by a rotary shaft 30 journalled in spaced bearings 32 carried by a bracket 34 supported at the rear of panel 10. From drum 26 the webs of threads pass over a guide roller 36 then upwardly over a guide roller 38 and from the latter across a stop motion device 40. Said stop motion device is of conventional construction and operates as usual, in a well known manner, to stop the machine in the event that any one of the threads breaks. From the stop motion device the webs of threads pass upwardly over a guide roller 42. Guide rollers 24 and 36 are positioned for holding the threads in engagement with drum 26. It will be understood that guide rollers 36, 38 and 42 are mounted for rotation on pins in the same way as guide roller 24.

The thread web Wa in passing upwardly from guide roller 42 is divided into the thread webs W1 and W2 which were derived initially from spools 18 and 20. For this purpose a group of threads constituting said webs W1 and W2 are engaged by upper and lower reciprocating plate members 44 and 46, respectively. Said plate members are slotted as illustrated in Figs. 6 and 7 and are provided with apertures through which the individual threads of the webs are passed. Thus referring to Fig. 6, the plate 44 comprises longitudinally extending slots 48 defined by the opposite edges of adjacent longitudinally extending strip portions 50 of the plate. Each of said strip portions is provided with an aperture 52 disposed centrally of the strip in which the aperture is located. Each aperture is preferably formed in a porcelain or other smooth or anti-friction bushing 54. Plate 46 has similarly arranged slots 56 defined by the opposite edges of adjacent strip portions 58 and also is provided with apertures 60 located centrally of said stripped portions, the latter being formed in anti-friction bushings 62. Plates 44 and 46 are mounted for reciprocation in horizontal planes, plate 44 being above plate 46 adjacent to the latter. Said plates are dimensioned and arranged so that the slots of one plate are in alignment with the apertures of the other plate. Accordingly, the threads from web W1 pass through the aperture 60 of plate 46 and through the slots 48 of plate 44, while the threads of web W2 pass through the slots 56 of plate 46 and through the apertures 52 of plate 44. Thus the threads of webs W1 and W2 are spread laterally of each other in each web in a plane at right angles to panel 10, and the threads of the different webs are laterally offset from each other in said plane. Plates 44 and 46 are provided with ears 64 and 66, respectively, by which said plates are secured to bars 68 and 70, respectively. Bar 68 is mounted for reciprocation in recesses 72 and 74 formed in the edge portions of brackets 76 and 78, respectively. Said brackets are secured at the front of the frame and are provided with removable bar retaining members 80 and 82, respectively. Bar 70 is mounted for reciprocation in a recess 86 formed in bracket 76 and in a recess formed in a bracket 88 which is of the same construction as bracket 78. Bars 68 and 70 have associated therewith companion actuating bars 90 and 92, respectively, positioned below bars 68 and 70. Bar 90 is mounted for reciprocation in a recess 94 in bracket 76 and in a recess 98 in bracket 78, and a bar 92, is similarly mounted for reciprocation in a recess 96 in bracket 76 and in a recess in bracket 88. Bars 90 and 92 are retained in bracket 76 by removably secured members 100 and in brackets 78 and 88 by removably secured members 102.

Bars 68 and 70 are reciprocated by mechanism including said bars 90 and 92 respectively. The reciprocating mechanism for said bars 68 and 70 includes rods 104 and 106 respectively. Rod 104 is pivotally engaged by a pin 107 carried by bar 90. The said pin projects through an opening 108 in said rod, the upper end portion 110 of rod 104 is provided with a pin 112 which is received within a transverse slot 114 in bar 68. The lower end 116 of rod 104 is slidable in a groove 118 formed in the head 120 of a pivotally mounted stub shaft 122. Rod 104 is secured in groove 118 by a retaining plate 124. The bearing for shaft 122 is constituted by a block 126 slidably mounted between the side bars 128 of a bracket 130 carried by the frame of the machine. Said block 126 is adjustable longitudinally of said bars 128 by means of a screw threaded rod 132 which is in screw threaded engagement with a threaded bore 134 in said block. Screw threaded rod 132 is held against longitudinal movement in bracket 130 by collars 136 and is provided with a knurled head 138 whereby rotation of said rod 132 is effective to adjust block 126 in bracket 130 longitudinally of its sides. Rod 106 is similarly connected to bars 70 and 92 and to a block 126 adjustable in bracket 130, it being understood that the end portion 140 of rod 106 is thus mounted for pivotal and sliding movement in the same way as the end portion 116 of rod 104 and that the opposite end portion 142 of rod 106 is connected to bar 70 in the manner illustrated in Fig. 1a in reference to the end portion 110 of rod 104. The engagement of bar 92 with rod 106 is by means of a pin 143 fixed to said bar and pivotally engaging said rod in an opening 144 in the same way as the engagement of rod 104 with bar 90.

Bars 90 and 92 are reciprocated in timed relation toward and from each other by means of Quillan cams 146 and 148, respectively, and for this purpose pins 107 and 143 carried by said bars are provided with rearwardly projecting portions 150 and 152, respectively, which engage the respective peripheral grooves of said cams. Cams 146 and 148 are secured to rotary shafts 154 and 156 respectively for rotation thereby. Shaft 154 is journalled in an outer bearing 158 and in a bearing 160 formed at the upper part of a bearing block 162. Shaft 156 is journalled in an outer bearing 164 and in an inner bearing 166 formed in the lower part of bearing block 162. The inner portions of shafts 154 and 156 are connected for rotation by gears 168 and 170 respectively, whereby upon rotation of shaft 154 in one direction shaft 156 is caused to rotate in the opposite direction thereby actuating cams 146 and 148 to reciprocate bars 90 and 92 toward and away from each other in timed relation.

Figure 13:
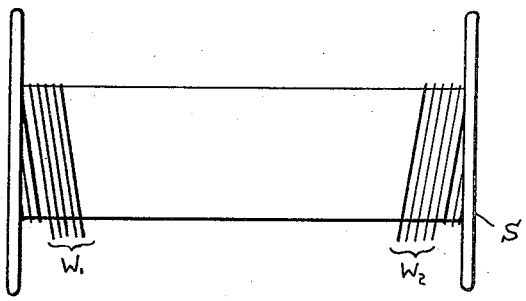
Figs. 13 to 15 are views illustrating, more or less diagrammatically, the windings on the spools, the threads being spaced and reduced in number for the purpose of illustration.
Figure 14:
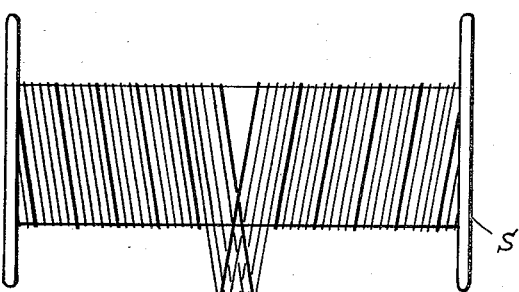
Figure 15:
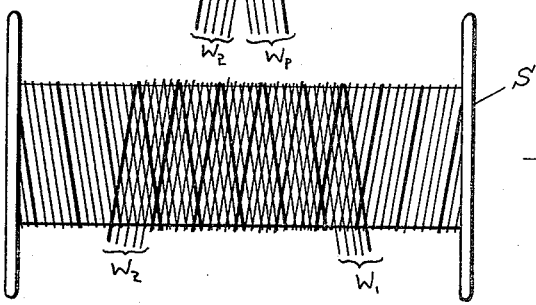

Reciprocation of bars 90 and 92 is effective through the mechanism hereinbefore described, said mechanisms including rods 104 and 106, to reciprocate bars 68 and 70 whereby slotted and apertured plates 44 and 46 are reciprocated in opposite directions in timed relation. The length of the paths of movement of plates 44 and 46 can be adjusted by adjusting blocks 126 in their brackets 130 in the manner described above. The reciprocation of plates 44 and 46 causes the thread webs W1 and W2 to move toward and away from each other by reason of the engagement of said thread webs by plates 44 and 46 respectively. As said webs pass upwardly through plates 44 and 46 they are wound upon a spool S which is rotated during the operation of the machine for producing the winding of said spool. Webs W1 and W2 first engage the spool at points spaced longitudinally of the spool axis preferably at points adjacent the opposite flanges thereof, respectively, as shown in Fig. 13. Then as the spool rotates said webs are brought toward each other and toward the center of the spool by the reciprocation of plates 44 and 46 toward each other, and as said plates continue to move in the same direction webs W1 and W2 cross each other, as illustrated in Fig. 14, individual threads of one web passing between threads of the other web. Further reciprocation of plates 44 and 46 each in the same direction as heretofore causes webs W1 and W2 to be wound on the spool as the latter rotates, and to move away from each other toward the opposite flanges of the spool, as illustrated in Fig. 15. Web W2 at the limit of its movement in one direction longitudinally of the spool is located with its endmost thread adjacent the flange of the spool opposite to the flange to which the endmost thread of said web was located at the start of the winding operation. At this point the direction of movement of each of plates 44 and 46 is reversed and likewise the direction of movement of each of the webs W1 and W2 longitudinally of the spool is also reversed. The individual threads of said webs cross each other again at the center of the spool, between the flanges, and said webs continue to move longitudinally of the spool to the flanges thereof. This operation is repeated for the full winding of the spool. In this manner, the individual threads of the webs W1 and W2 are brought into intersecting and interleaved relation substantially at the center of the spool at a plurality of spaced points longitudinally of the webs so that upon unwinding of the thread from the spool the crossed portions are retained and may be associated with crossed portions of a plurality of similarly wound spools in the manner which will hereinafter be described for forming a warp-beam forming web of the desired width.

The means for driving the several rotary shafts will now be described. The main drive shaft 172 is journalled for rotation in bearings 173 and may be driven in any suitable way, as by a motor "M", said shaft being provided with a pulley 174 driven by a belt 176 connected to the motor pulley 178. Shaft 154 is driven by a pulley 180 connected by means of a belt 182 to a pulley 184 rotated by main shaft 172. Shaft 30 which drives drum 26 is actuated by a pulley 186 connected by means of a belt 188 to a pulley 190 fixed to and rotated by said main shaft. Spool S is rotated by a pulley 192 connected by means of a belt 194 driven by pulley 196 fixed to said main shaft.

Pulley 192 for rotated spools S is fixed to and drives a shaft 198 journalled for rotation in bearings in a bracket 200. The inner end of said shaft is provided with a clutch member 202 having a friction surface 204 which engages one of the flanges of the spool S. The opposite flange of spool S is releasably engaged by a head 206 at one end of a rotary pin 208. Said head 206 is provided with a pin projection 210 which is received within the tubular axial portion 211 of the spool. The flange of head 206 is held releasably in engagement with the flange of the spool by a spring 212 which has one end thereof in engagement with an adjustable nut 214. The other end of the spring engages one side of a roller bearing 216 which is carried by rotary pin 208. Roller bearing 216 engages a stationary sleeve 218 in bearing block 220. Nut 214 is threaded into said block and beside serving to adjust the pressure of the spring 212 on the head 206 in engagement with the flange of the spool serves also as a bearing for rotary pin 208. The outer end of pin 208 is provided with a knob 222 to facilitate moving said pin longitudinally of its bearings against the pressure of spring 212 for removing spool S and replacing the latter with a similar spool.

As hereinbefore indicated the windings produced as above described on the spools S are subsequently utilized for forming the crosses in the full web for forming the warp beam. The manner in which this is accomplished will now be described. A number of windings on the spools S necessary to produce a warp beam of the desired width are supported in vertical position on a creel 224. The thread webs on each spool are then unwound and passed over a table or other support 226 through a comb reed 228 to the warp beam core C. Said warp beam core C is of conventional construction, and is mounted for rotation in bearings 230 supported on a bench or other suitable support 232 on which reed 128 is also supported. Said reed has a plurality of vertical slots for guiding the threads of the web to the beam core C. As the webs are unwound from their spools, the crossed portions thereof are located in transverse alignment in respect to the windings of each spool S, and a cross stick rod R is inserted between the webs W1 and W2 for the full transverse width of said webs which make up the full web WF. The ends of the full web WF are passed through reed 228 and attached to warp beam core C. As said web is wound on the core C, webs W1 and W2 of the multiplicity of spools S are unwound progressively, and when the other side of the crosses of said webs are off the spools, a second cross-stick or rod R is inserted between the webs W1 and W2 for the full width of the complete web WF, thus holding the threads of said web WF in shedded crossed relation. The crossed portions of the threads of the web WF is indicated by the dotted line L in Fig. 16 of the drawings, and it will be seen that there is a cross-stick or rod R at each side of said line. Said cross rods or sticks are supported on table 226 in grooves 234 formed in the top of said table at the sides thereof. Said pair of cross-sticks R remain temporarily in position on table 226, while web WF moves in the direction of the arrow in Fig. 16, i. e., toward warp beam core C. It will be understood that additional pairs of cross-sticks R may be supported on table 226 at opposite sides of other crossed portions of said web while the web travels toward said warp beam core. The cross-sticks R thus maintain the crosses in web WF during the travel of the latter toward the warp beam core.

Figure 21:
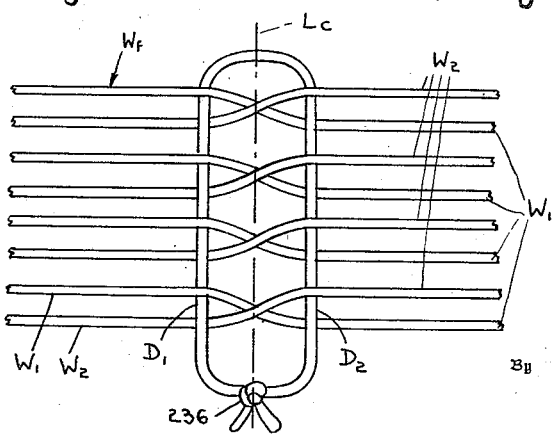
Fig. 21 is a view of a part of the web showing the secured cross, the threads being spaced and reduced in number for the purpose of facilitating the illustration.

The crosses are secured in the web WF between the reed 228 and the warp beam core C in a manner which will now be described. One of the cross-sticks R at the left of the cross line L is moved from its position on table 226 at one side of the cross nearest to reed 228 to a position adjacent reed 228 at the right thereof, as shown in dotted lines in Fig. 16, said cross-stick being mounted in position between the webs W1 and W2 of the complete web WF. Then as illustrated in Fig. 18, cross-stick R thus positioned adjacent the reed is raised, thereby lifting the webs W1 and spreading the same away from webs W2 a sufficient distance to permit the insertion of a length of cord D1 between said webs at a point between reed 228 and core C. The rod R which was moved to the dotted line position at the right of reed 228 is then withdrawn from the web. Then the cross-stick R at the right of the cross line L of said nearest cross is moved to a position adjacent reed 228, at the right thereof, that is, to the position formerly occupied by the cross-stick R which was theretofore at the left of said cross line L. Said cross-stick thus moved to said position is depressed, as illustrated in Fig. 19, thereby moving the webs W2 of the complete web WF downwardly to spread said webs, as illustrated in Fig. 19. While said webs are thus spread, a length of cord D2 integral with said first mentioned length D1 is passed between webs W1 and W2 for the full width of complete web WF. A complete cross is shown in Fig. 21, which illustrates more or less diagrammatically the webs W1 and W2 at opposite sides of the cross line LC, the threads being reduced in number and widely spaced for the purpose of more clearly illustrating the cross in the web. It will be observed that the ends of the cord lengths D1 and D2 are tied together at one side of the web, as indicated at 236, thereby securing the cross. It will be understood that similar crosses are formed in the web WF along points spaced longitudinally of said web during the travel of the web toward the warp beam core C while the web WF and the crosses secured therein as just described is wound on said core.

While I have disclosed the preferred embodiment of my invention, it will be understood that the latter may be embodied otherwise than as here shown, and that in the illustrated embodiment certain changes may be made and will occur to those skilled in the art particularly in view of the present disclosure. Therefore, I do not wish to be limited precisely to the specific form of the invention herein shown or described, except as may be required by the scope of the appended claims.

Having thus described my invention, what I claim and desire to secure by Letters Patent is:

1. The method of forming crosses in a web of threads for forming a warp beam, comprising forming a plurality of windings each having pairs of webs of threads arranged in the winding with the threads of one web of the pair intersecting the threads of the other web of the pair at a plurality of spaced points along the lengths of said webs, then unwinding a plurality of said pairs of webs to form a single beam-forming web having crosses provided therein at spaced points along the length thereof, and then securing said crosses in the beam-forming web.

2. The method of forming crosses in a web of threads for forming a warp beam, comprising forming a plurality of windings each having pairs of webs of threads arranged in the winding with the threads of one web of the pair intersecting the threads of the other web of the pair at a plurality of spaced points along the lengths of said webs, then unwinding a plurality of said pairs of webs to form a single beam-forming web having crosses provided therein at spaced points along the length thereof, then inserting cross-sticks in the last mentioned web at opposite sides of each cross at a point in the web at one side of a reed, moving said beam-forming web transversely of said cross-sticks to and through said reed, and then progressively securing each of said crosses at the other side of said reed and removing the cross-sticks at said first mentioned side of the reed.

3. The method of forming crosses in a web of threads for forming a warp beam, comprising forming a plurality of windings each having pairs of webs of threads arranged in the winding with the threads of one web of the pair intersecting the threads of the other web of the pair at a plurality of spaced points along the lengths of said webs, and then unwinding a plurality of said pairs of webs to form a single beam-forming web having crosses provided therein at spaced points along the length thereof.

4. The method of forming crosses in a web of threads for forming a warp beam, comprising arranging a plurality of threads in pairs of webs, winding said webs on a spool therearound in the same direction circumferentially of the spool and simultaneously traversing said webs on the spool in opposite directions longitudinally of the spool axis with the threads of one of said webs crossing the threads of the other of said webs in interleaved relation at a plurality of spaced points along the length of said webs, and then unwinding said pair of webs together with a plurality of similar windings of pairs of webs thereby to form a single beam-forming web having crosses provided therein at spaced points along the length thereof.

5. The method of forming crosses in a web of threads for forming a warp beam, comprising unwinding a plurality of single thread spools to form a web consisting of a plurality of threads disposed in side by side relation, dividing said last mentioned web into a pair of webs, winding said pair of webs on a spool with the threads of one of said pair of webs intersecting in interleaved relation the threads of the other of said pair of webs providing crosses in said winding at a plurality of points spaced along the length of said webs, and then unwinding said pair of webs together with a plurality of similar windings of pairs of webs thereby to form a single beam-forming web having crosses provided therein at spaced points along the length thereof.

6. The method of forming crosses in a web of threads for forming a warp beam, comprising unwinding a plurality of single thread spools to form a web consisting of a plurality of threads disposed in side by side relation, dividing said last mentioned web into a pair of webs, winding said webs on a spool therearound in the same direction circumferentially of the spool and simultaneously traversing said webs on the spool in opposite directions longitudinally of the spool axis with the threads of one of said webs crossing the threads of the other of said webs in interleaved relation at a plurality of spaced points along the length of said webs, and then unwinding said pair of webs together with a plurality of similar windings of pairs of webs thereby to form a single beam-forming web having crosses provided therein at spaced points along the length thereof.

7. The method of forming crosses in a web of threads for forming a warp beam, comprising forming a web consisting of a plurality of threads disposed in side by side relation, dividing said last mentioned web into a pair of webs, winding said pair of webs into a spool with the threads one one of said pair of webs intersecting in interleaved relation the threads of the other of said pair of webs providing crosses in said winding at a plurality of points spaced along the length of said webs, and then unwinding said pair of webs together with a plurality of similar windings of pairs of webs thereby to form a single beam-forming web having crosses provided therein at spaced points along the length thereof.

8. The method of forming crosses in a web of threads for forming a warp beam, comprising forming a web consisting of a plurality of threads disposed in side by side relation, dividing said last mentioned web into a pair of webs, winding said webs on a spool therearound in the same direction circumferentially of the spool and simultaneously traversing said webs on the spool in opposite directions longitudinally of the spool axis with the threads of one of said webs crossing the threads of the other of said webs in interleaved relation at a plurality of spaced points along the length of said webs, and then unwinding said pair of webs together with a plurality of similar windings of pairs of webs thereby to form a single beam-forming web having crosses provided therein at spaced points along the length thereof.

9. A thread-winding comprising a spool and a pair of separable non-woven thread webs wound thereon, each of said webs comprising a plurality of threads arranged in side by side relation, all of the threads of said webs wound on said spool extending in the same direction circumferentially of the spool, forming a plurality of layers in the winding, but with the threads of different webs extending in opposite directions, respectively, longitudinally of the spool axis, in the same layer of the winding, and with the threads of one of said webs in intersecting and in interleaved relation with the threads of the other web at a plurality of points spaced from each other along the length of said webs.

10. A thread-winding comprising a spool and a pair of separable non-woven thread webs wound thereon, each of said webs comprising a plurality of threads arranged in side by side relation, all of the threads of said webs wound on said spool extending in the same direction circumferentially of the spool forming a plurality of layers in the winding, said webs of threads traversing said spool alternately toward and away from each other in relation to a point intermediate the ends of the spool, and the threads of one of said webs intersecting the threads of the other of said webs at said intermediate points between two adjacent layers of the winding.

11. A thread-winding comprising a spool having a plurality of threads wound thereon and all extending in the same direction circumferentially of the spool, with groups of threads traversing the spool alternately in opposite directions longitudinally of the spool axis and with threads of one of said groups crossed and interleaved with the threads of another of said groups at a point intermediate the ends of the spool.

12. A thread-winding comprising a spool having a plurality of threads wound thereon and all extending in the same direction circumferentially of the spool, with groups of threads traversing the spool alternately in opposite directions longitudinally of the spool axis and with threads of one of said groups crossed and interleaved with the threads of another of said groups at a point intermediate the ends of the spool, there being a plurality of said points of crossed and interleaved threads at intervals in said winding whereby, upon unwinding of said threads from the spool, the crossed and interleaved points are spaced along the length of the threads.

13. In apparatus for forming a thread-winding in which a plurality of threads are wound on a spool with groups of threads traversing the spool alternately in opposite directions longitudinally of the spool axis and with threads of one of said groups crossed and interleaved with the threads of another of said groups at a point intermediate the ends of the spool, a spool mounted for rotation, means engageable with different groups of threads and movable in opposite directions longitudinally of the spool axis to cause the threads, while being wound on the spool, to traverse the spool alternately in opposite directions with the path of one group of threads in a direction opposite to the path of another of said group of threads and with the threads of one of said groups crossed and interleaved with the threads of another of said groups at a point intermediate the ends of the spool, means for rotating said spool, and means for simultaneously moving said thread engaging means alternately in opposite directions longitudinally of the spool axis.

14. In apparatus for forming a thread-winding in which a plurality of threads are wound on a spool with groups of threads traversing the spool alternately in opposite directions longitudinally of the spool axis and with threads of one of said groups crossed and interleaved with the threads of another of said groups at a point intermediate the ends of the spool, a rotary drum, means for guiding a plurality of threads to and over said drum in side by side relation thereon, a rotary spool to which the threads pass from the drum and on which said threads are wound, two members disposed between said drum and said spool and mounted for reciprocation in opposite directions longitudinally of the spool axis, said members being engageable with different groups of said threads and operable during their reciprocation to traverse the spool alternately in opposite directions with the path of one group of threads in a direction opposite to the path of another of said group of threads and with the threads of one of said groups crossed and interleaved with the threads of another of said groups at a point intermediate the ends of the spool, means for rotating said spool, and means for simultaneously reciprocating said members.

15. In apparatus for forming a thread-winding in which a plurality of threads are wound on a spool with groups of threads traversing the spool alternately in opposite directions longitudinally of the spool axis and with threads of one of said groups crossed and interleaved with the threads of another of said groups at a point intermediate the ends of the spool, a rotary drum, means for guiding a plurality of threads to and over said drum in side by side relation thereon, a rotary spool to which the threads pass from the drum and on which said threads are wound, members disposed between said drum and said spool and mounted for reciprocation in opposite directions longitudinally of the spool axis, said members being engageable with different groups of said threads and operable during their reciprocation to traverse the spool alternately in opposite directions with the path of one group of threads in a direction opposite to the path of another of said group of threads and with the threads of one of said groups crossed and interleaved with the threads of another of said groups at a point intermediate the ends of the spool, means for rotating said spool, and means for simultaneously reciprocating said members, said last mentioned means comprising a pair of rotary cams operatively connected to said members, respectively, for actuating the same, and means for rotating said cams in opposite directions.

16. In apparatus for forming a thread-winding in which a plurality of threads are wound on a spool with groups of threads traversing the spool alternately in opposite directions longitudinally of the spool axis and with threads of one of said groups crossed and interleaved with the threads of another of said groups at a point intermediate the ends of the spool, a spool mounted for rotation, means engageable with different groups of threads and movable in opposite directions longitudinally of the spool axis to cause the threads, while being wound on the spool, to traverse the spool alternately in opposite directions with the path of one group of threads in a direction opposite to the path of another of said group of threads and with the threads of one of said groups crossed and interleaved with the threads of another of said groups at a point intermediate the ends of the spool, means for rotating said spool, means for simultaneously moving said thread engaging means alternately in opposite directions longitudinally of the spool axis, said last mentioned means comprising a pair of rotary cams operatively connected to said members, respectively, for actuating the same, and means for rotating said cams in opposite directions.

17. In apparatus for forming a thread-winding having intersecting and interleaved threads, a spool mounted for rotation, a pair of thread-traversing members mounted for reciprocation longitudinally of the spool axis, in opposite directions and in timed relation, said members each having a plurality of longitudinal slots and a plurality of laterally spaced apertures at opposite sides of said slots, the apertures in each member of the pair being substantially in alignment with the slots of the other member of the pair, whereby threads passing through the apertures of one member of the pair can move longitudinally of the slots of the other member of the pair as said members reciprocate, means for rotating said spool to wind thereon groups of threads passing, respectively, through said apertures of said pair of members, and means for simultaneously reciprocating said thread-traversing members to cause said threads to traverse said spool in being wound thereon and to cause the threads of the different groups to repeatedly intersect each other in interleaving relation at a point intermediate the ends of the spool.

18. In apparatus for forming a thread-winding in which a plurality of threads are wound on a spool with groups of threads traversing the spool alternately in opposite directions longitudinally of the spool axis and with threads of one of said groups crossed and interleaved with the threads of another of said groups at a point intermediate the ends of the spool, a rotary drum, means for guiding a plurality of threads to and over said drum in side by side relation thereon, a rotary spool to which the threads pass from the drum and on which said threads are wound, a pair of thread-traversing members disposed between said drum and said spool and mounted for reciprocation longitudinally of the spool axis, in opposite directions and in timed relation, said members each having a plurality of longitudinal slots and a plurality of laterally spaced apertures at opposite sides of said slots, the apertures in each member of the pair being substantially in alignment with the slots of the other member of the pair, whereby threads passing through the apertures of one member of the pair can move longitudinally of the slots of the other member of the pair as said members reciprocate, means for rotating said spool to wind thereon groups of threads passing, respectively, through said apertures of said pair of members, and means for simultaneously reciprocating said thread-traversing members to cause said threads to traverse said spool in being wound thereon and to cause the threads of the different groups to repeatedly intersect each other in interleaving relation at a point intermediate the ends of the spool.

19. In apparatus for forming a thread-winding having intersecting and interleaved threads, a spool mounted for rotation, a pair of thread-traversing members mounted for reciprocation longitudinally of the spool axis, in opposite directions and in timed relation, said members each having a plurality of longitudinal slots and a plurality of laterally spaced apertures at opposite sides of said slots, the apertures in each member of the pair being substantially in alignment with the slots of the other member of the pair, whereby threads passing through the apertures of one member of the pair can move longitudinally of the slots of the other member of the pair as said members reciprocate, means for rotating said spool to wind thereon groups of threads passing, respectively, through said apertures of said pair of members, and means for simultaneously reciprocating said thread-traversing members to cause said threads to traverse said spool in being wound thereon and to cause the threads of the different groups to repeatedly intersect each other in interleaving relation at a point intermediate the ends of the spool and means for adjusting the distance of travel of said slots.

20. In apparatus for forming a thread-winding in which a plurality of threads are wound on a spool with groups of threads traversing the spool alternately in opposite directions longitudinally of the spool axis and with threads of one of said groups crossed and interleaved with the threads of another of said groups at a point intermediate the ends of the spool, a spool mounted for rotation, means engageable with different groups of threads and movable in opposite directions longitudinally of the spool axis to cause the threads, while being wound on the spool, to traverse the spool alternately in opposite directions with the path of one group of threads in a direction opposite to the path of another of said group of threads and with the threads of one of said groups crossed and interleaved with the threads of another of said groups at a point intermediate the ends of the spool, means for rotating said spool, means for simultaneously moving said thread engaging means alternately in opposite directions longitudinally of the spool axis, and means for adjusting the distance of travel of said thread engaging means.

BERTRAM J. GOLDSMITH.